Patented Aug. 8, 1939

2,169,200

UNITED STATES PATENT OFFICE 2,169,200

DULL FINISH COATED FABRIC AND PROCESS OF MAKING THE SAME

Frank G. Uhler, Newburgh, N. Y., assignor to E. I. du Pont de Nemours & Company, Wilmington, Del., a corporation of Delaware No Drawing. Application November 6, 1937, Serial No. 173,195

3 Claims. (Cl. 91—68)

This invention relates to articles coated with cellulose derivative compositions and having a dull or matte finish. More particularly it relates to a process and product capable of producing a dull finish on cellulose nitrate coated fabrics.

In the protective coating composition field, for example in the manufacture of leather substitutes, there is an extensive demand for a surface possessing a dull finish. The surface obtained by spreading cellulose derivative compositions on fabrics is often so bright and of such high luster that the product is unsuitable for many uses.

It is known that a dull finish leather substitute may be produced by coating the bright finish material (obtained by conventional processes) with a finish composition having a high pigment content. The appearance of such a finish is usually satisfactory. Such products are not generally acceptable to the trade, however, because they crock badly and the surface of such material is not as smooth as desirable. The easy removal of pigment from the vehicle by abrasion is called "crocking". The easy removal of the pigment from finishing composition having a high pigment content by abrasion such as would occur in normal use of the material, precludes their use in such fields as upholstery and wearing apparel accessories such as belts, millinery trimmings, etc. Leather substitutes coated with such compositions are somewhat objectionable because they lack the dry feel of leather.

Attempts have been made to secure dull finishes by coating the conventional finish leather substitutes with cellulose nitrate coating compositions containing immiscible, non-drying and semi-drying oils. The products obtained in such attempts have not found extensive use for various reasons, among which may be mentioned the difficulty in producing finishes of uniform dullness, and what is more important from the manufacturers' viewpoint, the difficulty in maintaining the homogeneity of the composition.

A still further proposed solution of the problem contemplates the incorporation of a flattening agent such as aluminum stearate, diatomaceous earth, silica gel, talc, and the like, in a cellulose derivative coating composition used as a final coat. Products obtained in this manner are unsatisfactory particularly on non-rigid surfaces, since the finish tends to crack and flake when folded or flexed. Such products also have the objectionable property of whitening along fold lines when in use. Such a process is objectionable from the manufacturers' standpoint because the flattening agent tends to agglomerate in the vehicle, forming aggregates which produce white spots on the surface to which the composition is applied.

This invention had for an object the provision of dull finishes on materials coated with cellulose nitrate. Other objects were the provision of smooth, non-crocking, non-pigmented, non-cracking, non-flaking, uniform finishes on leather or coated sheets intended as leather substitutes, the provision of a dull finish consisting essentially of cellulose nitrate and an ester of cellulose with an organic acid, and the provision of a cellulose nitrate composition which, when applied to a smooth flexible surface, deposits a dull film which will not crack, peel, or turn white upon creasing of the base to which it is applied, while imparting a leather-like feel. A general advance in the art and other objects which will appear hereinafter are also contemplated.

It has now been found that a dull finish may be obtained on objects having cellulose derivative coatings by coating the same with a solution of cellulose nitrate in which a cloud of fine particles of cellulose acetate has been precipitated, and thereafter removing the solvent from the solution. Such finishes have a desirable dry feel, and approximate leather in other characteristics, as will appear hereinafter.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

A dull finish coating composition was prepared by mixing a solution containing:

| | Parts |
|---|---|
| Cellulose nitrate | 4.05 |
| Ethyl alcohol | 9.63 |
| Ethyl acetate | 9.63 | with a solution containing:

| | Parts |
|---|---|
| Cellulose acetate | 4.56 |
| Ethyl acetate | 11.66 |
| Acetone | 6.99 | until a homogeneous liquid was obtained, and thereafter adding a mixture containing:

| | Parts |
|---|---|
| Ethyl alcohol | 11.74 |
| Ethyl acetate | 11.74 |
| Toluene | 30.00 | and stirring until the product was uniform and had a milky-white appearance.

This composition was then applied over a bright finished coated fabric obtained by spreading a plurality of coats of a composition consisting of:

| | Per cent |
|---|---|
| Cellulose nitrate | 13.62 |
| Ethyl alcohol | 27.00 |
| Ethyl acetate | 17.99 |
| Pigment | 14.18 |
| Castor oil | 27.21 |
| | 100.00 | on a woven cotton sateen fabric (1.12 yards per pound per 53 inches width) and having a thread count of 96 x 60, and top coating the thus coated (undercoated) material with a composition consisting of:

| | Per cent |
|---|---|
| Cellulose nitrate | 12.35 |
| Ethyl alcohol | 43.83 |
| Ethyl acetate | 43.82 |
| | 100.00 |

In all, 10.5 ounces (per yard of 50 inch width) of the under coat and 1.0 ounce of the top coat (based on non-volatile components) were deposited in producing the bright finish material. The solvent was removed after each successive coat was applied.

After drying to remove the solvent from the dull finish composition (this required one minute at 240° to 270° F. or 116° to 132° C.), there was obtained a leather substitute having a smooth, non-crocking, non-pigmented, non-peeling, uniform finish consisting essentially of cellulose nitrate and cellulose acetate. The solvent type ingredients such as ethyl alcohol and ethyl acetate are ordinarily fairly completely removed in drying.

The percentage composition of the dull finish composition before application to the coated fabric was as follows:

| | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Toluene | 30.00 |
| | 100.00 |

*Example II*

A clear composition consisting of:

| | Per cent |
|---|---|
| Cellulose nitrate | 4.05 |
| Ethyl alcohol | 9.63 |
| Ethyl acetate | 29.77 |
| Cellulose acetate | 4.56 |
| Acetone | 21.99 |
| Toluene | 30.00 |
| | 100.00 | was applied over the coating obtained by spreading 1.0 ounce (based on non-volatile components) of a composition consisting of:

| | Per cent |
|---|---|
| Cellulose nitrate | 12.35 |
| Ethyl alcohol | 43.83 |
| Ethyl acetate | 43.82 |
| | 100.00 | on a previously coated fabric obtained by spreading on a woven cotton sateen fabric weighing 1.12 yards per yard per 53 inches wide, 10.5 ounces (based on non-volatile components), in a plurality of coats, of a composition consisting of:

| | Per cent |
|---|---|
| Cellulose nitrate | 13.62 |
| Ethyl alcohol | 27.00 |
| Ethyl acetate | 17.99 |
| Pigment | 14.18 |
| Castor oil | 27.21 |
| | 100.00 |

The volatile solvents were removed after each successive coat was applied.

After the solvent had been removed from the final coat (the acetone containing composition of this example), a dull finish was not obtained. The leather substitute had the conventional bright finish of cellulose derivative coating compositions such as that present before application of the final coating material.

*Example III*

A dull finish coating composition consisting of:

| | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Isopropyl alcohol | 30.00 |
| | 100.00 | was prepared in the same manner described in Example I. It had a milky-white appearance. When applied over a coated fabric in the manner described in Example I, an attractive dull finish similar in properties to the final finish obtained in Example I was produced.

*Example IV*

A dull finish coating composition consisting of:

| | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Toluene | 15.00 |
| Isopropyl alcohol | 15.00 |
| | 100.00 | was prepared in the manner described in Example I. It had a milky-white appearance. When applied over a coated fabric in the manner described in Example I, an attractive dull finish similar in properties to the final finish obtained in Example I was produced.

*Example V*

A dull finish coating composition consisting of:

| | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Toluene | 15.00 |
| Isopropyl acetate | 15.00 |
| | 100.00 | was prepared in the manner described in Example I. It had a milky-white appearance. When applied over a coated fabric in the manner described in Example I an attractive dull finish similar in properties to the final finish obtained in Example I was produced.

Example VI

A dull finish coating composition consisting of:

|  | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Isopropyl acetate | 30.00 |
|  | 100.00 | was prepared in the manner described in Example I. It had a milky-white appearance. When applied over a coated fabric in the manner described in Example I, an attractive dull finish similar in properties to the final finish obtained in Example I was produced.

Example VII

A dull finish coating composition consisting of:

|  | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Butyl alcohol | 30.00 |
|  | 100.00 | was prepared in the manner described in Example I. It had a milky-white appearance. When applied over a coated fabric in the manner described in Example I, an attractive dull finish similar in properties to the final finish obtained in Example I was produced.

Example VIII

A dull finish coating composition consisting of:

|  | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Toluene | 15.00 |
| Butyl acetate | 15.00 |
|  | 100.00 | was prepared in the manner described in Example I. It had a milky-white appearance. When applied over a coated fabric in the manner described in Example I, an attractive dull finish similar in properties to the final finish obtained in Example I was produced.

Example IX

A dull finish coating composition consisting of:

|  | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Benzene | 30.00 |
|  | 100.00 | was prepared in the manner described in Example I. It had a milky-white appearance. A leather substitute having a bright and colored finish was prepared by coating a fabric weighing 14.3 ounces per yard (1.12 yards per pound) per 53 inches width and having a sateen weave with a uniform composition consisting of:

|  | Per cent |
|---|---|
| Cellulose nitrate | 7.17 |
| Ethyl alcohol | 35.37 |
| Ethyl acetate | 35.36 |
| Pigment | 11.05 |
| Castor oil | 11.05 |
|  | 100.00 | and removing the solvent.

A dull finish having smooth, non-crocking, non-pigmented, non-peeling, uniform characteristics was obtained on the leather substitute by coating it with the coating composition described in the first paragraph of this example, and removing the volatile constituents.

Example X

A dull finish coating composition consisting of:

|  | Per cent |
|---|---|
| Cellulose nitrate | 4.05 |
| Ethyl alcohol | 21.37 |
| Ethyl acetate | 33.03 |
| Cellulose acetate | 4.56 |
| Acetone | 6.99 |
| Amyl alcohol | 30.00 |
|  | 100.00 | was prepared in the manner described in Example I. It had a milky-white appearance. A leather substitute having a bright and colored finish was prepared by coating a fabric running 1.12 yards per pound (53 inches wide) and having a sateen weave with a uniform composition consisting of:

|  | Per cent |
|---|---|
| Cellulose nitrate | 7.17 |
| Ethyl alcohol | 35.37 |
| Ethyl acetate | 35.36 |
| Pigment | 11.05 |
| Castor oil | 11.05 |
|  | 100.00 | and removing the solvent.

A dull finish having a smooth, non-crocking, non-pigmented, non-peeling, and uniform characteristics was obtained on the leather substitute by coating it with the coating composition described in the first paragraph of this example and removing the volatile constituents.

Example XI

A dull finish coating composition consisting of:

|  | Per cent |
|---|---|
| Cellulose nitrate | 4.50 |
| Ethyl alcohol | 23.76 |
| Ethyl acetate | 36.75 |
| Cellulose acetate | 5.00 |
| Acetone | 7.77 |
| Isopropyl alcohol | 22.22 |
|  | 100.00 | was prepared in the same manner described in Example I. It had a milky-white appearance. When applied over a coated fabric in the manner described in Example I, an attractive dull finish similar in properties to the final finish obtained in Example I was produced.

Example XII

A dull finish coating composition consisting of:

| | Per cent |
|---|---|
| Cellulose nitrate | 3.37 |
| Ethyl alcohol | 17.81 |
| Ethyl acetate | 27.53 |
| Cellulose acetate | 3.80 |
| Acetone | 5.83 |
| Isopropyl acetate | 41.66 |
| | 100.00 | was prepared in the manner described in Example I. It had a milky-white appearance. When applied over a coated fabric in the manner described in Example I, an attractive dull finish similar in properties to the final finish obtained in Example I was produced.

Denatured alcohol corresponding to Internal Revenue Bureau formula 2-B denatured alcohol which consists of 100 gallons of 95% by volume of ethyl alcohol to which is added one-half gallon of benzol, and denatured alcohol corresponding to the Internal Revenue Bureau's formula 23-A which consists of 100 gallons of ethyl alcohol to which has been added 10 gallons of C. P. acetone, may be used in the above formulations.

As will be apparent from the specific examples, the invention in general consists in applying a cellulose nitrate coating composition containing a fine cloud of cellulose acetate particles over the surface upon which the dull finish is desired. Preferably the cellulose acetate is caused to precipitate in the cellulose nitrate coating composition in the form of fine particles by the presence of various substances, such as hydrocarbons of the benzene series, alcohols, esters, and the like, for convenience called cellulose acetate precipitants. The more volatile materials of this group are in general preferred because they are more easily removed in the drying of the final coat. Toluene apparently gives the best results, probably because its formulation is very easily controlled. Other hydrocarbons of the benzene series which function in this capacity are xylene, naphthalene and ethyl benzene. Good surface effects are also obtained by utilizing benzene, but this material has some physiological disadvantages. Especially desirable results are obtained with such alcohols, as ethyl, propyl, isopropyl, butyl, isobutyl, amyl, and isoamyl. In using these compounds the persistent, highly aromatic odor of the high members of the series, for example amyl alcohol, must be taken into consideration. On an equivalent weight basis the alcohols seem to be the most effective in causing precipitation of the cellulose acetate. The hydrocarbons come next in effectiveness. The esters, while generally considered satisfactory, are the least effective for the precipitation of the cellulose acetate on an equivalent weight basis. Such substances as isopropyl acetate, propyl acetate, butyl acetate, isobutyl acetate, amyl acetate and isoamyl acetate are advantageously used. Apparently the effectiveness of the esters increases with the length of chain in the alcohol radical. Ethyl acetate has not been found suitable as a cellulose acetate precipitant.

The proportion of hydrocarbon of the benzene series to the total amount of cellulose nitrate, cellulose acetate and hydrocarbon usually falls within the range of about 20.0% to about 80.0%. On the same basis the proportion of the incompatible (incompatible with cellulose acetate) alcohol usually falls within the range of about 15.0% to 75.0%. Similarly, the proportion of the incompatible ester is about 25.0% to about 85.0%.

In general the higher homologues of the incompatible esters, hydrocarbons and alcohols are more effective in producing a dull finish than the lower members of each series. However, the higher homologues are more difficult to control from a manufacturing standpoint.

It is noted that Example I results in a dull finish, whereas Example II, which has the same ratio of cellulose nitrate, cellulose acetate and precipiating diluent (toluene), results in a bright finish. When the ratio of cellulose acetate to cellulose nitrate is substantially 1:1 it has been found that a satisfactory dull finish can be produced when the ratio of the cellulose acetate solvent (for example, acetone) to the precipitating diluent for the cellulose acetate is within the range from about 1:3 to about 1:10. However, the preferred range for the ratio is about 1:5 to about 1:8. The above ranges are based on naked eye observations. It is not practical to increase the precipitating diluent beyond the range of 1 of cellulose acetate solvent to 10 of the said diluent, since a greater quantity of said diluent tends to precipitate the cellulose acetate in the form of large agglomerates (as distinguished from a cloud of fine particles), and the resulting compositions are not homogeneous.

To produce a dull or matte finish, the compositions of this invention may be applied by any suitable means known to those skilled in the art as, for example, by means of a doctor knife, roller coating equipment, spraying methods and flow coat methods. The dull finish composition may be applied over other surfaces than the cellulose derivative composition coatings mentioned above, for example, resin coated surfaces, such as surfaces coated with alkyd resins, urea-formaldehyde, polymeric methacrylates, phenol-formaldehyde, vinyl acetate, and the like. The dull finish composition may be applied over pigmented coatings or over unpigmented coatings which are superimposed on pigmented base coatings. The composition may be applied to base coatings either on rigid or non-rigid surfaces to produce a pleasing dull or matte finish which does not possess the usual disadvantages of dull finishes known in the present state of the art.

Reclaimed (so-called) cellulose nitrate may be used in place of freshly nitrated (virgin) material and various types of nitrate ester commonly known in the art are satisfactory. Likewise, pigments or dyes may be incorporated in the compositions without impairing the matte finish. The viscosity of the cellulose nitrate is not of primary importance. Material having a viscosity of 90 to 110 seconds when tested by the A. S. T. M. D-301-33 method is ordinarily used. Reclaimed cellulose acetate may also be used in place of freshly acetylated cellulose.

Acetone which is a mutual solvent or dispersion medium for the acetate and nitrate ester may be replaced by other cellulose acetate solvents such as methyl ethyl ketone or ethyl acetate.

Diluents such as ethyl alcohol, butyl alcohol, amyl alcohol and aromatic hydrocarbons like toluene and benzene may be used when and as desired, although they are not essential.

Softeners for cellulose nitrate such as dibutyl tartrate, diamyl phthalate, dibutyl phthalate, castor oil (raw or blown), blown cottonseed oil, blown rape seed oil, etc., may also be used in the practice of the invention. These materials are used in proportions readily determined empirically by persons skilled in the art.

The ratio of cellulose acetate to cellulose nitrate may be varied considerably. In general the ratio is of the order of equal parts of the two esters. Variation trends will be apparent from the specific examples. In general it is preferred that neither ester greatly predominate over the other.

Resins generally tend to increase gloss, and for this reason, appreciable quantities are usually avoided.

The compositions of this invention are applicable for use as lacquers on rigid and semi-rigid surfaces, as, for example, the decorating of metal, wood, glass, stone-ware and the like, as well as such self-sustaining fabrics as cloth, all kinds of coated fabrics, paper, regenerated cellulose, also synthetic or natural resins and the like. The unusual properties of finished appearance and feel of material to which the compositions of the invention have been applied make the composition particularly adapted for use as a finish on coated fabrics commonly known in the industry as artificial leather, particularly those types of material which are used for upholstery work. Instead of utilizing continuous coatings, discontinuous (for example stencil) coatings may be employed when desired, as for instance, in the production of decorative effects. If desired the dull finish material may be applied as the sole coating.

The compositions find further wide use for imparting a dry feel to coated papers used for artificial leather where in many instances it is impossible to obtain such a feel with the regular types of coating compositions. Fabrics having a cellulose derivative base coat finished with the compositions herein disclosed find extensive use as ladies' belts and other wearing accessories, flexible black-boards, pocketbooks, and handbag material and leather substitutes used for bookbinding. Because of the unique finish and feel imparted to coated fabrics by compositions of the invention the compositions are particularly suitable as a finish for coated fabrics made to simulate damask or linen materials. The compositions may also be used to impart a smooth feel to rough finished paper stocks of various types, regenerated cellulose film, cellulose acetate, nitrate and other cellulose ester sheet material, celluloid sheets and the like to which in addition to the smoothness imparted a matte or dull finish is given.

When the finish which results from compositions of the invention is rubbed or abraded there is no discoloration on the materials which have come in contact with the finish.

A further advantage of the invention is its freedom from any tendency to whiten upon sharp folding or flexing of the base to which it is applied.

A further advantage is the production of a leather-like feel to surfaces to which the compositions are applied. The compositions of the invention are of such a type as to permit uniform production with consequent uniform results in the finish produced and the elimination of the disadvantages inherent in the present types of compositions used to produce dull finishes on fabrics used as leather substitutes and similar materials.

A further advantage is the application of the finish to any colored surface with the resulting dull finish of the same color as the base material to which the composition is applied, thus obviating the necessity for different colored finishing compositions for different colored base materials.

In a co-pending application, S. N. 155,099 filed July 22, 1937, by Raymond E. Thomas, there are disclosed and claimed broadly cellulose acetate-cellulose nitrate compositions containing a precipitant for the cellulose acetate. Although hydrocarbons of the benzene series, alcohols and esters are disclosed in said Thomas application, they are claimed specifically in the present application instead of in the said Thomas application, since they are the invention of the present applicant.

As many apparently widely different embodiments of this invention may be made without departing from the spirit and scope thereof, it is to be understood that I do not limit myself to the specific embodiments thereof except as defined in the appended claims.

I claim:

1. In the process of coating fabrics the improvement of imparting thereto a dull finish which comprises preparing a clear dispersion of cellulose nitrate and cellulose acetate and adding a volatile organic precipitant thereto to precipitate the cellulose acetate only in the form of a fine dispersion, and thereafter applying the cloudy composition to a coated fabric.

2. Process of claim 1 in which the cellulose nitrate and cellulose acetate are present in approximately equal parts.

3. In the process of preparing artificial leather wherein a fabric is coated with a cellulose derivative composition, the improvement which comprises the securing of a dull finish by preparing a cellulose nitrate dispersion, preparing a cellulose acetate dispersion, mixing the two dispersions to form a clear homogeneous liquid, and thereafter precipitating cellulose acetate only throughout the cellulose nitrate solution in the form of a fine cloud by adding a precipitant selected from the group consisting of hydrocarbons of the benzene series, alcohols, and esters, stirring said mixture until it is uniform and has a milky-white appearance, and thereafter applying the mixture to said coated fabric.

FRANK G. UHLER.